(12) United States Patent
Ehleiter et al.

(10) Patent No.: US 11,697,212 B2
(45) Date of Patent: Jul. 11, 2023

(54) FEEDING DEVICE FOR A MANIPULATOR ARM HAVING AT LEAST ONE JOINT AND STIFFENING DEVICE FOR SUCH A FEEDING DEVICE

(71) Applicant: Daimler AG, Stuttgart (DE)

(72) Inventors: Juergen Ehleiter, Schorndorf (DE); Marc-Andre Graewer, Wendlingen (DE)

(73) Assignee: Daimler AG, Stuttgart (DE)

( * ) Notice: Subject to any disclaimer, the term of this patent is extended or adjusted under 35 U.S.C. 154(b) by 61 days.

(21) Appl. No.: 16/980,086

(22) PCT Filed: Mar. 11, 2019

(86) PCT No.: PCT/EP2019/055942
§ 371 (c)(1),
(2) Date: Sep. 11, 2020

(87) PCT Pub. No.: WO2019/175069
PCT Pub. Date: Sep. 19, 2019

(65) Prior Publication Data
US 2021/0016435 A1    Jan. 21, 2021

(30) Foreign Application Priority Data
Mar. 14, 2018    (DE) ..................... 10 2018 002 026.7

(51) Int. Cl.
*B25J 19/00*    (2006.01)
*B25J 9/14*    (2006.01)

(52) U.S. Cl.
CPC ........... *B25J 19/0025* (2013.01); *B25J 9/142* (2013.01)

(58) Field of Classification Search
CPC ............................. B25J 19/0025; B25J 9/142
(Continued)

(56) References Cited

U.S. PATENT DOCUMENTS 4,427,033 A * 1/1984 Ege .................. F16L 11/12
74/502.5
4,790,624 A * 12/1988 Van Hoye ............... F03G 7/065
600/151

(Continued)

FOREIGN PATENT DOCUMENTS

CN    101959655 A    1/2011
CN    107771120 A    3/2018
(Continued)

OTHER PUBLICATIONS

WO 2004076133 (Claude Burlot) Oct. 9, 2004 (Description), [online] [retrieved on Mar. 10, 2022]. Retrieved from: PATENTSCOPE. (Year: 2004).*

(Continued)

*Primary Examiner* — Joseph Brown
(74) *Attorney, Agent, or Firm* — Crowell & Moring LLP (57) ABSTRACT

A feeding device for a manipulator arm has at least one joint, in particular of an industrial robot, having a flexible cable package via which at least one process medium can be fed at least substantially along the end effector of the manipulator arm and having a flexibly slack guide cover element enclosing the cable package. A stiffening device having a holding device is provided, which is arranged in a fixed position on the flexibly slack guide cover element. At least one stiffening element held by the holding device is provided, which, in an activated state of the stiffening device, is acted upon by stiffening energy such that the flexibly slack guide cover element and consequently the cable package are stiffened by the stiffening element.

5 Claims, 5 Drawing Sheets

(58) Field of Classification Search
USPC .................................................. 74/490.02
See application file for complete search history.

(56) References Cited

U.S. PATENT DOCUMENTS

| | | | | |
|---|---|---|---|---|
| 6,207,902 | B1 * | 3/2001 | Balaguer | B25J 19/06 |
| | | | | 174/15.7 |
| 6,565,126 | B1 * | 5/2003 | Julien | F16L 39/02 |
| | | | | 285/122.1 |
| 6,811,124 | B2 | 11/2004 | Karlinger | |
| 8,663,096 | B2 * | 3/2014 | Viola | A61B 1/0055 |
| | | | | 600/141 |
| 10,688,656 | B2 * | 6/2020 | Alambeigi | A61B 1/0051 |
| 2011/0014371 | A1 | 1/2011 | Herre et al. | |
| 2012/0067158 | A1 | 3/2012 | Kell et al. | |
| 2017/0291312 | A1 * | 10/2017 | Ziv-Av | B25J 19/0004 |
| 2019/0381596 | A1 * | 12/2019 | Sakurai | B25J 15/0019 |
| 2020/0035380 | A1 * | 1/2020 | Tokumoto | H01B 11/002 |

FOREIGN PATENT DOCUMENTS

| | | | |
|---|---|---|---|
| DE | 102 24 858 B4 | 1/2004 | |
| DE | 10 2008 011 383 A1 | 9/2009 | |
| DE | 10 2011 015 984 A1 | 10/2012 | |
| DE | 10 2016 203 361 A1 | 9/2017 | |
| DE | 10 2016 203 552 A1 | 9/2017 | |
| EP | 2 431 140 A1 | 3/2012 | |
| JP | 11-48171 A | 2/1999 | |
| JP | 2012-115979 A | 6/2012 | |
| JP | 2014-46443 A | 3/2014 | |
| WO | WO-2004076133 A1 * | 9/2004 | ......... B25J 19/0025 |
| WO | WO 2020/156910 A1 | 8/2020 | |

OTHER PUBLICATIONS

PCT/EP2019/055942, International Search Report dated Jun. 24, 2019 (Two (2) pages).
Japanese Office Action issued in Japanese application No. 2020-548703 dated Oct. 26, 2021, with partial English translation (Eight (8) pages).
German-language German Office Action issued in German application No. 10 2018 002 026.7 dated Nov. 30, 2020 (Six (6) pages).
Chinese Office Action issued in Chinese application No. 201980018849.2 dated Jan. 28, 2023, with partial English translation (Ten (10) pages).
German-language European Office Action issued in European application No. 19 711 532.2-1002 dated Mar. 24, 2023 (Five (5) pages).

* cited by examiner

FEEDING DEVICE FOR A MANIPULATOR ARM HAVING AT LEAST ONE JOINT AND STIFFENING DEVICE FOR SUCH A FEEDING DEVICE

BACKGROUND AND SUMMARY OF THE INVENTION

The invention relates to a feeding device for a manipulator arm having at least one joint. Furthermore, the invention relates to a stiffening device for such a feeding device.

Feeding devices for industrial robots used in series production are used in modern production plants, especially in series production, in particular of motor vehicles. A respective feeding device is provided for a manipulator arm having at least one joint, in particular of an industrial robot, and has a flexible cable package via which at least one process medium can be fed at least substantially along the end effector of the manipulator arm. Furthermore, the feeding device has a flexibly slack guide cover element which surrounds the cable package.

The cable package is flexible, i.e., flexibly slack or bendable, and is designed to be deformed by means of the manipulator arm such that the cable package, while deforming itself, at least substantially follows a movement of the manipulator arm. The cable package has at least one cable or several cables combined in the cable package. A respective cable of the cable package can in each case comprise at least one electrical conducting element, at least one fluid conducting element and/or another pipe, cable and/or hose element, such that by means of the cable package, the at least one process medium can be fed to the end effector and/or the at least one process medium can be discharged from the end effector.

The flexible cable package runs at least substantially along the manipulator arm, for example at least substantially in parallel to the manipulator arm. In particular, the cable package can run from a base of the industrial robot or manipulator arm to the end effector, in particular from a third motion axis to a sixth motion axis of the manipulator arm, wherein the end effector is arranged in a region of the sixth motion axis of the manipulator arm or the industrial robot.

In the case of the industrial robot, an end effector is a last kinematic link in a kinematic chain of the industrial robot and can be designed, for example, as a gripper unit, as a tool unit (for example, welding, riveting, screwing unit, etc.) and/or as a sensor unit etc.

By means of the cable package, at least one process medium can be fed to the end effector, which can in particular be electricity, at least one fluid and/or at least one object. Similarly, the at least one process medium can be discharged from the end effector by means of the flexible cable package. For this purpose, the at least one cable of the flexible cable package can be designed as an electrical conducting element (for example cable, wire etc.), such that electrical sensor signals, electrical welding energy, electrical operating energy etc. can be transported along the manipulator arm by means of the cable package or by means of the feeding device. Alternatively or additionally, a single cable of the cable package can be designed as a fluid guide element, such that coolant, adhesive, lubricant, water, hydraulic fluids, inert gas, etc. can be transported by means of the feeding device. In the same way, it is common practice nowadays that at least one cable of the cable package is designed as another pipe, cable and/or hose element, such that screws, rivets, welding wire, material etc. can be passed and/or guided through the feeding device. The flexibly slack guide cover element is, in the stretched or straight state, a pipe or a hose element which forms an inner space in which the cable package is arranged, such that a longitudinal central axis of the cable package and a longitudinal central axis of the guide cover element coincide. Usually, a conventional guide cover element is made of a flexible pipe or corrugated plastic hose. By means of the guide cover element, the individual cables of the cable package are to be held together in the interior of the guide cover element in order to prevent objects adjacent to the manipulator arm from threading or hooking between the individual cables of the cable package and consequently to protect the feeding device against damage. In itself, the guide cover element is designed to be flexibly slack or bendable, such that the guide cover element in the assembled state at least substantially follows a shape and/or course of the cable package.

Such conventional feeding devices are limited in their flexibility due to material properties, in particular of the guide cover element, such that retraction systems, which can be designed as a spring-operated and/or cable pull-operated device, for example, are to be provided. These retraction systems ensure that the cable package or the guide cover element is subject to a basic mechanical tension in order to ensure the best possible guidance along the manipulator arm. In this way, the cable package or the feeding device should be prevented from hooking onto adjacent robots or other objects. Furthermore, the retraction systems reduce a required extension length of the cable package of the feeding device, for example if the required extension length of the cable package is reduced by moving the manipulator arm.

These retraction systems are particularly complex and vulnerable, such that an unwanted standstill of the manipulator arm, because it is unproductive or does not add value, is often due to a malfunction or defect of the retraction system.

In order to avoid chafing of the manipulator arm when pulling back the cable package in the case of conventional feeding devices, protector elements are nowadays also to be provided on the feeding device, in particular on the guide cover element. These hit the manipulator arm when the cable package is pulled back instead of the guide cover element or instead of the feeding device and are intended to prevent particularly high wear of the guide cover element and/or damage to the manipulator arm due to the cable package hitting it. This, however, results in a particularly loud friction and/or impact noise.

Due to the respective masses of the retraction systems and the protector elements, conventional feeding devices are particularly mass-intensive, which is why a mass of the feeding device has to be taken into account when planning a path or a process path. This is because the feeding device is firmly mounted on the manipulator arm or on the industrial robot, such that the feeding device can be moved by means of the manipulator arm during a process carried out by means of the manipulator arm. This results in a particularly complex path planning or process planning for the manipulator arm. Also due to the masses of the retraction systems or the protector elements, the energy requirement for operating the manipulator arm or the industrial robot is particularly high.

Due to the flexural slackness of the guide cover element or the feeding device, it is possible that parts of the feeding device may hit the manipulator arm unintentionally, in particular when the manipulator arm accelerates jerkily, which is manifested in a particularly high load for the manipulator arm or the industrial robot. In this way, the service life of the manipulator arm, for example, can be significantly reduced. The impact of the protector elements can lead to damage in the manipulator arm, whereby the service life of the manipulator arm is also further reduced.

It is the object of the present invention is to develop such a conventional feeding device in such a way that a manipulator arm equipped with it can be operated in a particularly energy-efficient, low-cost and durable manner. Advantages and advantageous designs of the feeding device according to the invention are to be regarded as advantages and advantageous designs of the stiffening device according to the invention and vice versa.

In order to develop a feeding device of the type indicated herein in such a way that the manipulator arm equipped therewith can be operated in a particularly energy-efficient, low-effort and durable manner, a stiffening device having a holding device is provided in accordance with the invention, which is arranged in a positionally fixed manner on the flexibly slack guide cover element. Furthermore, in accordance with the invention, at least one stiffening element is provided, which is held by means of the holding device and which, in an activation state of the stiffening device, is acted upon by a stiffening energy, whereby the flexibly slack guide cover element and consequently the cable package are stiffened by means of the stiffening element.

In other words, the feeding device according to the invention has the stiffening device, which in turn has the holding device. By way of example, the holding device and the guide cover element can be connected to each other by means of an adhesion, welding etc., such that the stiffening element, which is held or can be held by means of the holding device, and the guide cover element are immovable relative to each other.

By way of example, due to a control signal, which can be made available to the stiffening device by a control unit, in particular a control unit of the manipulator arm or industrial robot, without cables or in a cable-bound manner, the stiffening device can be moved into the activation state. In an analogous manner, the stiffening device can be set to a deactivation state in which the stiffening energy is not provided to the stiffening element, or the stiffening energy can be at least partially discharged from the stiffening element.

The stiffening element can be at least substantially flexibly slack in a rest state, for example in the deactivation state of the stiffening device, or can be arranged in a first form characterizing the rest state of the stiffening device. It is conceivable, for example, that the stiffening element has a shape memory alloy or is at least partially made of the shape memory alloy. A component made of a shape memory alloy (SMA component) has a cold form at an initial temperature and can be reversibly formed into a warm form different from the cold form by heating it to a temperature which is higher than the initial temperature. This means that the SMA component, which has the warm form when heated, for example by means of an electric current, can be (re)formed into the cold form by cooling—at least substantially to the initial temperature.

Accordingly, the stiffening energy can, for example, be electrical energy or voltage, heat, pressure etc., which is supplied or made available to the stiffening element in the activated state of the stiffening device. By way of example, due to an electrical stiffening energy, the stiffening element comprising the shape memory alloy is more flexibly rigid in comparison to the rest or deactivation state and/or is or can be arranged in a form characterizing the activation state.

More precisely, stiffening is to be understood to mean that, in the stiffened state or activation state, a respective direction of an actual longitudinal center fibre (neutral fibre) of the stiffening element and an imaginary longitudinal center line correspond more closely than in the rest or deactivation state. In other words, in the activated state, the stiffening energy at the stiffening element causes the stiffening element to strive to arrange its longitudinal center fibre at least substantially parallel to the imaginary longitudinal center line. Expressed again in other words, by means of the stiffening device via the stiffening element and via the holding device, a stiffness can be imparted to the feeder device holding the cable package, such that in the activation state—without using a separate retraction system—a required extension length of the cable package can be adjusted solely by moving the manipulator arm.

In contrast to conventional feeding devices, the feeding device according to the invention allows the retraction systems and protector elements to be omitted, whereby the feeding device is to be designed in a particularly mass-efficient manner. Consequently, a manipulator arm or industrial robot equipped with this feeding device can be operated in a particularly energy-efficient manner. An unintentional hooking of the feeding device, in particular of the cable package, into adjacent robot units or objects is also effectively prevented by the feeding device.

Furthermore, the influence of the particularly mass-efficiently designed feeding device on the process path of the manipulator arm is particularly low, such that the path planning or process planning can be carried out with particularly little effort, since the corresponding masses of the retraction systems or protector elements do not have to be taken into account in path planning.

Furthermore, the impact and/or abrasion effect of the feeding device on the manipulator arm is particularly low; ideally, this impact and/or abrasion effect is completely eliminated. This means that the manipulator arm can be operated for a particularly long time.

Moreover, there is no stop noise caused by the protector elements in the case of the conventional feeding device, whereby the manipulator arm or the feeding device according to the invention can be operated with particularly low noise emissions.

Overall, the feeding device results in particularly low costs when operating a manipulator arm or industrial robot equipped with the feeding device.

The stiffening device of the feeding device can have a connecting element via which the stiffening energy can be provided to the at least one stiffening element. Particularly preferably, a supply device which is not described in more detail herein and which generates and/or provides the stiffening energy can be reversibly and detachably—without tools—connected to the stiffening element via the connecting element in a manner which conducts stiffening energy.

It has proved to be particularly advantageous that the at least one stiffening element is designed as a flexibly slack hose element with a hose wall delimiting a duct element through which a fluid can flow and which is completely filled with the fluid in the activated state, and the stiffening element is subjected to the stiffening energy by applying a stiffening pressure to the fluid in the duct element. In particular, the hose element or the duct element can be fluid-tight at one end, for example have a fluid-tight end, such that the hose element and the fluid-tight end together delimit a pressure chamber. In particular, the material of the hose element can comprise silicone, i.e., the hose element can be made at least partially of silicone. The silicone hose element formed in this way allows particularly small bending radii without impairing or restricting a function of the feeding device. This ensures a particularly reliable function or operation of the feeding device or the manipulator arm or industrial robot equipped with it. Furthermore, the silicone hose element is particularly resistant to kink damage, such that a risk of damaging the feeding device due to the particularly small bending radii or due to pinching is particularly low.

An inner peripheral surface of the hose element or the hose wall delimits the duct element, which is thereby designed to be tubular or hose-like. This means that the hose element has an at least substantially circular cross-section along its longitudinal extension at least in the activated state. Accordingly, the hose element can be designed as a circular ring cylinder. By contrast, in the deactivation state, the hose element can have a cross-section different from that of an annular cylinder, in particular it can be flexibly slack or particularly bendable.

The fluid can be a liquid, for example oil, water etc. and/or gas. This is particularly advantageous, since in an industrial plant, in particular a manufacturing plant, such process fluids are available anyway for operating the industrial plants, in particular the manipulator arm. It is also advantageous that there is no need for electrical energy to operate or supply the stiffening element, such that no electrical field is created which could have an undesirable influence on the adjacent data and/or sensor signal cables in the cable package.

Preferably, the fluid is formed as air, while the stiffening energy is formed as an energy with which the air can be pressurized. In other words, an increase in pressure in the air arranged in the duct element produces an increase in the stiffening energy, such that in the case of an increase in air pressure in the hose element, a stiffening and/or further stiffening of the stiffening element and consequently of the cable package occurs.

Air as a process fluid is not only particularly easily available, but in case of a faulty leakage of the stiffening device, it has only a very small, and in particular no permanent, e.g., damaging, effect on neighboring plant components, a floor of the production plant etc. Moreover, in contrast to a liquid, the stiffening element or even the entire stiffening device must not be freed from the liquid, for example emptied, in particular when the stiffening element is replaced. Similarly, it is not necessary to vent or fill the stiffening element or stiffening device with the fluid when the system is put back into operation.

If air, in particular compressed air, is used in the stiffening element, this and consequently the stiffening device is pneumatically controllable and/or adjustable. In particular, due to the pneumatic controllability, the stiffening energy can be provided continuously to the stiffening element, such that a plurality of respectively different stiffening states, for example between particularly stiff and particularly slack, can be formed, in particular according to requirements, for example depending on a movement sequence of the manipulator arm. Due to the control system, a fixed pressure can be statically provided to the stiffening element over the entire process runtime. Alternatively or additionally, due to the control system, a plurality of respectively different pressures can be dynamically provided to the stiffening element, for example depending on a respective process step. The pneumatic control or control system can be integrated into the control of the manipulator arm or industrial robot such that the manipulator arm and the feeding device can be controlled together, in particular via a common control unit.

The feeding device is particularly easy to maintain or repair if the holding device has at least one stiffening element receptacle arranged in parallel to the guide cover element, by means of which the at least one stiffening element is held on the holding device. By way of example, the stiffening element receptacle can be designed as a further hose element with an inner peripheral surface delimiting a receiving space, such that the stiffening element can be arranged in the receiving space and can be held therein. In particular, the stiffening element designed as a hose element can be inserted into the stiffening element receptacle in such a way that a respective longitudinal central axis of the stiffening element receptacle and the stiffening element coincide. If the stiffening element is pushed into the stiffening element receptacle, the stiffening element is arranged in parallel to the guide cover element and consequently parallel to the cable package and is held fixed in this position.

This is particularly advantageous because, in the event of maintenance and/or repair, at least one stiffening element can be removed from the stiffening element receptacle particularly easily or another, for example new, stiffening element can be inserted particularly easily into the stiffening element receptacle. In this way, a period of time during which the feeding device and consequently the manipulator arm are at a standstill due to a defect can be made particularly short. Accordingly, a thought has been given to a new, particularly advantageous service strategy.

It is conceivable that the hose element and the holding device, in particular the stiffening element receptacles, are each formed from elongated elements which can be cut to length (known in linguistic usage as "yard goods"). In this way, a plurality of different designs of the feeding device can be manufactured with very little effort. This is because the length and/or diameter of the feeding device, in particular of the cable package or the individual cables of the cable package, can be adapted particularly easily by selecting the correspondingly designed elements which can be cut to length.

Particularly preferably, the feeding device has a plurality of stiffening elements and a plurality of corresponding stiffening element receptacles, such that the cable package is stiffened particularly reliably. In particular, a number of the stiffening elements or stiffening element receptacles used in the feeding device can depend on a radial diameter of the cable package or on a radial diameter of the guide cover element. By way of example, for a particularly small diameter of the guide cover element, three stiffening elements arranged in parallel to the cable package can be sufficient, whereas for a larger diameter of the guide cover element, four, five, six, seven, etc. stiffening elements and correspondingly many stiffening element receptacles can be used.

The holding device and the guide cover element are each particularly easy to manufacture if the holding device and the guide cover element are formed in one piece. As already described, the guide cover element and the holding device can each comprise at least one hose element, wherein both hose elements can be coextruded with each other, for example. This ensures a particularly reliable positional arrangement of the holding device and the guide cover element with respect to each other.

It has been shown to be further advantageous if the holding device and the guide cover element are each at least partially made of a textile structure. In other words, a material of the holding device and/or a material of the guide cover element can each comprise a textile structure and/or be at least partially made of the textile structure. Depending on the type of textile structure, the textile structure can have a braid, a woven fabric, a mesh structure (for example a knitted fabric) and/or a non-woven fabric.

In particular, the holding device and the guide cover element can be manufactured together in one piece in a particularly simple and/or low-effort manner by sewing, stitching etc. the guide cover element and the holding device or the stiffening element receptacle from a textile fabric. In addition, the textile holding device and the textile guide cover element are each designed to be particularly bendable or flexibly slack, such that the textile holding device and the textile guide cover element can each cling particularly closely to the cable package. Furthermore, the textile structure has a particularly thin material thickness, such that when the textile holding device and the textile guide cover element are used, the feeding device can be manufactured in a particularly compact and/or space-efficient manner.

In the case of the feeding device, it can be provided that the stiffening device has a flexibly slack protective cover element which is formed separately from the guide cover element and, in a protective position, jointly encloses the cable package, the holding device, the guide cover element and the at least one stiffening element. Particularly preferably, the protective cover element can be made at least partially of a textile structure. In the protective position, the protective cover element forms a tube-like and/or hose-like protective space through which the elements arranged in the protective cover element run, such that the protective cover element delimits the elements of the feeding device arranged in the protective space from an environment of the feeding device. Via the protective cover element, the feeding device can slide with particularly low resistance on a surface of the manipulator arm, such that friction and consequently damage to the manipulator arm and/or the feeding device is particularly effectively prevented.

A further advantage is that the protective cover element, in conjunction with the holding device arranged in it, displays a particularly high protective effect for the cable package, as a deformation zone is created by the protective cover element distanced from the cable package by means of the holding device. In the event of a collision of the protective cover element with an object, in particular during operation of the manipulator arm or industrial robot, an impact occurs correspondingly on the protective cover element, which can deform into the deformation zone—without damage to the cable package—such that the cable package is particularly well protected against a direct impact.

Furthermore, by designing an appropriate textile structure (for example cloth, yarn, fibre and/or material, structure type as well as possible after-treatment of the textile structure, for example, coating, impregnation etc.), the guide cover element or the protective cover element or the guide cover element and the protective cover element can be adapted to different requirements, such as a hot, humid, dry, cold, chemical-containing environment etc. In this way, the feeding device can be used particularly flexibly and can be adapted to the various requirements with very little effort.

In a development of the invention, the protective cover element can have a closing unit which is reversibly and non-destructively adjustable between an open position, in which the protective cover element is open along its longitudinal direction of extension, and the protective position, in which the protective cover element is closed along its longitudinal direction of extension. For this purpose, the closing unit can, for example, have at least one Velcro fastener which is operated in a particularly simple and low-error manner and which can be applied particularly advantageously to the protective cover element designed as a textile, for example, can be sewn to a basic body of the protective cover element during manufacturing of the protective cover element.

Thus, if necessary, only the protective cover element subject to wear can be replaced particularly easily or with little effort if it is damaged and/or worn or if the feeding device is to be adapted to a changed requirement. In this way, the feeding device can be operated particularly efficiently.

Furthermore, the time required to replace the protective cover element, i.e., to disassemble and assemble it, is particularly short, since the protective cover element can be adjusted to the open position without uncoupling one end of the feeding device, for example from the end effector. A time saving during assembly or disassembly of the protective cover element leads to particularly little unproductive downtime of the feeding device and consequently of the manipulator arm or industrial robot.

In order to make the path and or process movement planning of the manipulator arm or industrial robot particularly simple and low-effort, a first end of the stiffening device can be formed by a connection unit, via which the stiffening device can be or is fixed to the manipulator arm far from the end effector. This means that the stiffening device can be fixed via the connection unit, for example, in a region of a third movement axis or in a region of another movement axis of the manipulator arm or the industrial robot, for example to its base or first movement axis.

In particular, the connecting unit can have a ball joint, such that a relative movement between the end of the stiffening device and the manipulator arm is enabled. This results in a particularly advantageous pronounced flexibility or movability of the feeding device in relation to the manipulator arm. This ensures that the first end of the stiffening device can follow a movement of the manipulator arm particularly flexibly. A disadvantageous tensioning of the feeding device is effectively counteracted and inherent movements of the feeding device, for example due to objects moving or being transported through the cable package, are not transmitted to the manipulator arm via a rigid connection. Accordingly, the manipulator arm can be moved or controlled with particular precision, which is reflected in particularly simple path planning.

It can be provided that the connecting element is integrated into the connection unit. By way of example, the connecting element can be a threaded hole, into which a supply line of the supply unit can be inserted, for example screwed in, by means of a threaded connection. The threaded hole can be moulded, for example drilled, into a base body of the connecting unit. As a result, there is no installation space for a separately formed connecting element, via which the feeding device can be supplied with the stiffening energy. Therefore, the feeding device must be manufactured in a particularly compact and/or space-efficient manner.

The connecting unit can have a distributor unit which connects the at least one stiffening element with the connecting element in a manner that conducts stiffening energy. In particular if several stiffening elements or several stiffening element receptacles are used, the stiffening energy can be provided or supplied to the individual stiffening elements via the one, common connecting element.

In a development, the stiffening device can comprise a reversibly and non-destructively detachable fastening device, by means of which the connecting unit and the protective cover element can be detachably fastened to each other, and a first fastening element of the fastening device is arranged on the connection unit and a second fastening element of the fastening device corresponding to the first fastening element is arranged on the protective cover element. In this way, it can be ensured in a particularly advantageous manner that the protective cover element is held in a fixed position on the connecting unit and does not slip, for example along a longitudinal central axis of the protective cover element or of the cable package, and that the protective effect of the protective cover element is thereby less than with a protective cover element held correctly in position.

The fastening device can, for example, have a further Velcro fastener, the first Velcro fastener element of which, for example a loop strap, can be applied particularly advantageously to the textile protective cover element, for example, can be sewn to a basic body of the protective cover element during manufacturing. A second Velcro fastener element, for example a hook strap, is to be attached accordingly to the connecting unit, for example by adhesion.

A second end of the stiffening device can be formed by a second connecting unit, by means of which the stiffening device can be fixed to the manipulator arm near the end effector. This ensures that the second end of the stiffening device can follow the movement of the manipulator arm even more flexibly. Furthermore, the disadvantageous tensioning of the feeding device is further counteracted and the intrinsic movements of the feeding device are not transmitted via a rigid connection to the manipulator arm, in particular to the end effector. For this reason, the manipulator arm or industrial robot equipped with the feeding device can be used to implement particularly reliably reproducible paths and/or process movements of the manipulator arm.

It is particularly preferred if the first connecting unit and the second connecting unit are each at least substantially designed as identical parts or identical in construction. This results in a particularly efficient and cost-effective production of the feeding device, since the first and second connecting units can be manufactured according to a common construction plan. If the connecting element is integrated into the connecting unit, the moulding or drilling of the threaded hole can simply be omitted when manufacturing the connecting unit on the end effector side. Alternatively, a sealing element can be provided to seal the threaded hole on the end effector side, by means of which the threaded hole can be sealed in a fluid-tight manner by means of the threaded connection.

The stiffening device of the feeding device can have a guide device having at least one guide element, by means of which the cable package, the holding device, the guide cover element and the at least one stiffening element can be guided together on the manipulator arm. The guide element can be fastened to the manipulator arm in a fixed position, for example screwed onto it. Furthermore, the guide element can be designed in particular as a circular ring cylinder, such that the cable package, the holding device, the guide cover element and/or the at least one stiffening element can extend through the guide element. A longitudinal central axis of the guide element and a common longitudinal central axis of the cable package, the holding device, the guide cover element and/or the at least one stiffening element can coincide with one another. An inner peripheral surface of the guide element can be designed, for example, to be particularly smooth, such that the elements of the feeding device extending through the guide element can slide along it with particularly low resistance.

In other words, the guide device or the guide element enables the elements of the feeding device enclosed by the guide element to move, for example shift, along their longitudinal extension. On the other hand, the guide device or guide element blocks the elements of the feeding device enclosed by the guide element from deviating, for example along a radial direction of the feeding device.

In addition, the guide device can be used to guide the protective cover element arranged in the protective position on the manipulator arm, wherein the protective cover element particularly advantageously forms a sliding surface of the feeding device corresponding to the inner peripheral surface of the guide element, such that the elements of the feeding device enclosed by the protective cover element can slide along the inner peripheral surface of the guide element with even less resistance via the protective cover element.

In order to consider the idea of the new advantageous service strategy even further, the stiffening device can have a sensor device having at least one sensor element, via which an evaluation unit can provide at least one sensor signal characterizing a state of the stiffening device. The at least one sensor element can in particular respectively have at least one pressure sensor, temperature sensor, strain gauge, electrical resistance, optical sensor, capacitive sensor etc. In particular, it is conceivable that the sensor element is integrated into a material of the feeding device. If the protective cover element is made of or comprises the textile structure, the sensor element can comprise a sensor incorporated into the textile structure. This could be a sensor fibre woven into the textile structure, a particularly flat sensor which is possibly arranged between two textile layers of the textile structure, etc. In other words, the textile structure from which the protective cover element can be at least partially manufactured can be a so-called "smart textile".

In particular, the at least one sensor element of the sensor device can be used to detect a temperature, pressure, degree of wear etc. of the feeding device. Of particular interest is the detection of the degree of wear of elements of the feeding device which are subject to a particularly high degree of wear, in particular of the protective cover element. The sensor signal characterizing this respective state of the stiffening device can be provided, for example transmitted, to the sensor device wirelessly, for example via WLAN (wireless local area network), Bluetooth (data transmission via radio technology), NFC (near field communication via electromagnetic induction), etc. and/or wired.

In this way, the idea of "Industry 4.0" is particularly taken into account. A user of the manipulator arm or industrial robot can thus be provided with data and/or parameters of the feeding device in a particularly simple way. In other words, process data monitoring by the user can be guaranteed with particularly low effort. It is particularly advantageous that information about wear and tear, threatening malfunctions and/or defects can be made available, for example displayed, to the user in this way. This enables a particularly prompt ordering of spare parts, in particular before the manipulator arm or the feeding device comes to a standstill due to the malfunction or defect. This further results in a particularly short repair time.

In addition, the invention relates to a stiffening device for a feeding device according to the invention for a manipulator arm having at least one joint, in particular of an industrial robot, having a flexible cable package, via which at least one process medium can be fed at least substantially along the end effector of the manipulator arm, and a flexibly slack guide cover element surrounding the cable package.

The stiffening device according to the invention is based on the idea of equipping already existing manipulator arms or industrial robots or their respective feeding device with the stiffening device. Then the manipulator arms or industrial robots equipped with the stiffening device could be operated in a particularly energy-efficient, low-effort and/or durable manner. The effort required for this is particularly low, since no new manipulator arms/industrial robots have to be procured, but rather these are only to be equipped with the stiffening device in order to achieve the advantages explained in connection with the feeding device according to the invention.

A construction plan of the stiffening device, in particular of the connection unit or connection units, can be designed in such a way that a stiffening device to be manufactured can be manufactured depending on a size and/or weight class of the robot or manipulator arm to be equipped with the stiffening device. The stiffening device can be designed to be modular such that, for example, different numbers of stiffening elements can be used depending on the weight class.

Further advantages, features and details of the invention arise from the following description of a preferred exemplary embodiment and from the drawings. The features and combinations of features mentioned above in the description as well as the features and combinations of features mentioned in the following Figure description and/or shown in the Figures alone can be used not only in the combination specified in each case, but also in other combinations or on their own without leaving the scope of the invention.

DETAILED DESCRIPTION OF THE DRAWINGS

In the Figures, identical or functionally identical elements are provided with identical reference numerals.

Figure 1:
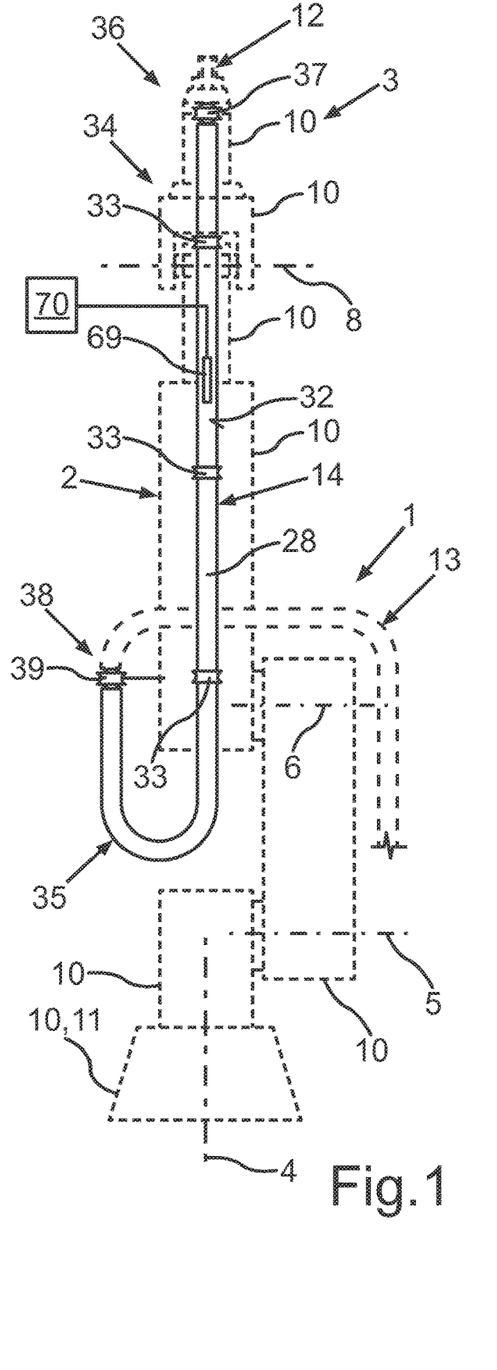
FIG. 1 is a schematic top view of a feeding device for a manipulator arm.
Figure 2:
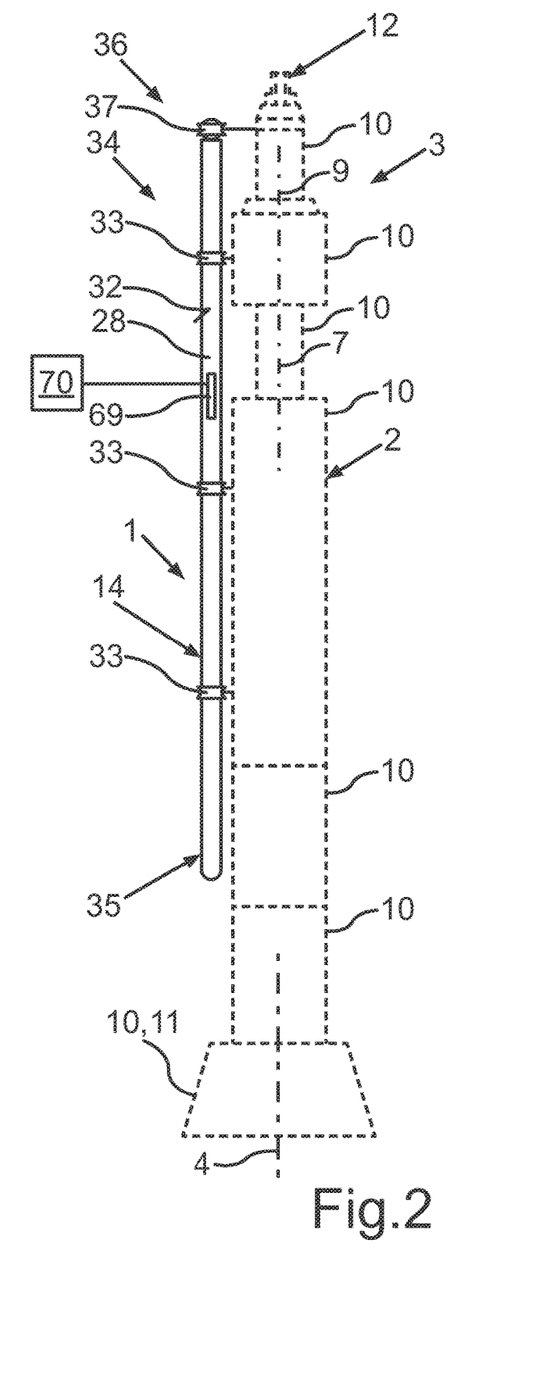
FIG. 2 is a schematic side view of the feeding device for the manipulator arm.

FIG. 1 shows in a schematic top view and FIG. 2 in a schematic side view a feeding device 1 for a manipulator arm 2. The manipulator arm 2 is part of an industrial robot 3, which usually has six movement axes 4 to 9. The movement axes 4 to 9 are each defined by a respective swivel joint which rotatably connects two directly adjacent members 10 of the industrial robot 3 or the manipulator arm 2 with each other. An end effector 12, which can be designed as a gripping unit, connecting unit, in particular a welding unit, riveting unit, screwing unit, etc. is arranged on a member 10 which is furthest away from a base 11 of the industrial robot 3. In order to feed at least one process medium to the end effector 12 or to discharge a process medium from the end effector, the feeding device 1 comprises a cable package 13 which is designed to be flexible or bendable, such that the flexible cable package 13 can be adapted to a respective position of the industrial robot 3 or the members 10 of the industrial robot 3 or of the manipulator arm 2. The process medium can be, for example, electrical operating energy, a coolant, material, adhesive, lubricant, screws, rivets and/or welding wire etc., which can be fed to the end effector 12 via the cable package 13. For this purpose, at least one cable or several cables are combined in the cable package 13, through which the process medium(s) can be fed.

In order to design the manipulator arm 2, which is equipped with the feeding device 1, to be operable in a particularly energy-efficient, low-effort and durable manner, a stiffening device 14 is provided, by means of which the cable package 13 can be stiffened as required. The stiffening device 14 is designed in such a way that it can be applied to an already existing, conventional feeding device, for example by retrofitting it. The stiffening device 14 is described in detail below.

Figures 3, 4, 5:
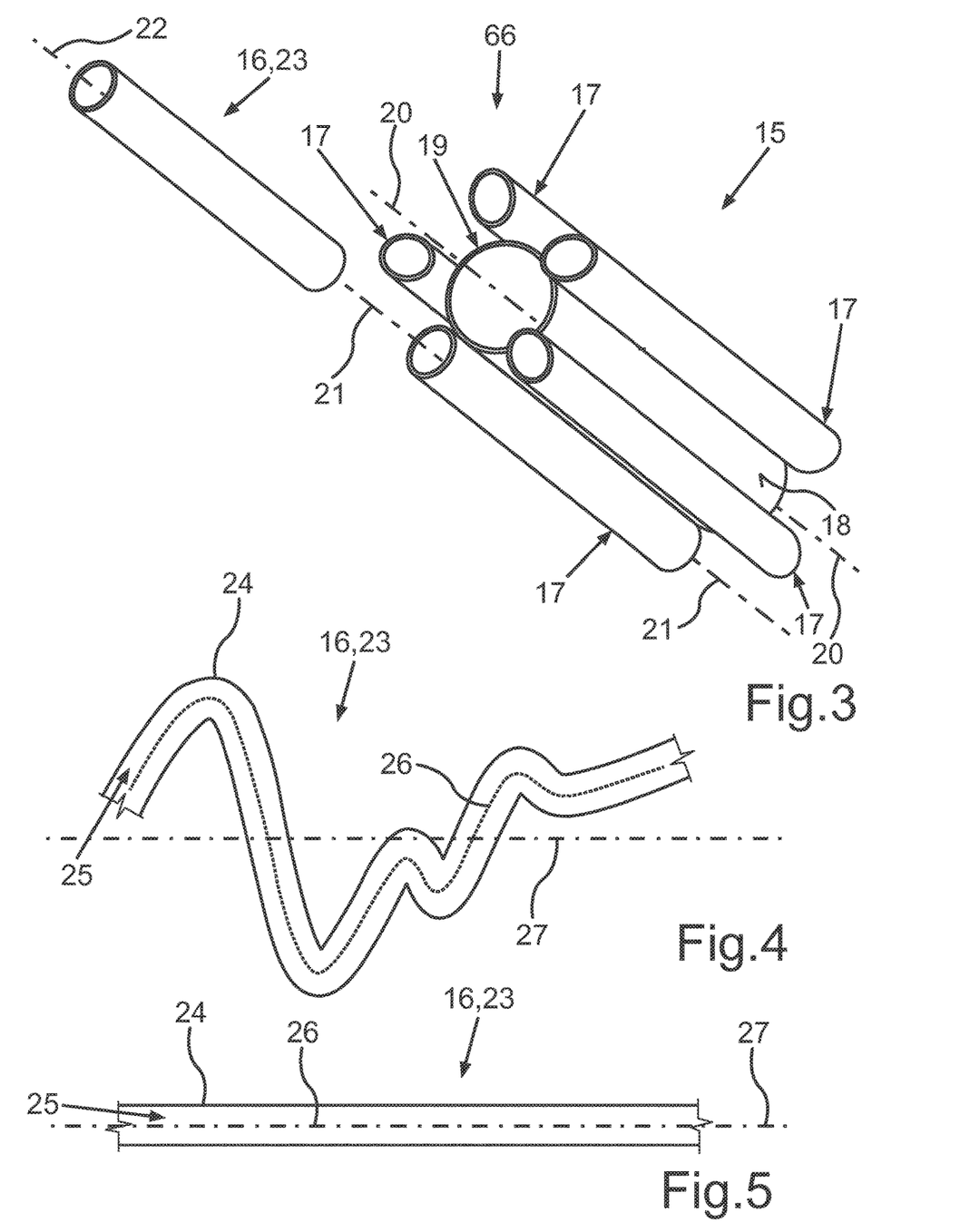
FIG. 3 is a schematic and perspective view of a holding device and a stiffening element.
FIG. 4 is a schematic view of the stiffening element.
FIG. 5 is a schematic view of the stiffening element in an activation state.

FIG. 3 shows, in a schematic and perspective view, a holding device 15 and a stiffening element 16. In the present case, the holding device 15 has five stiffening element receptacles 17 which are arranged along an outer peripheral surface 18 of a guide cover element 19. In this case, a longitudinal central axis 20 of the guide cover element 19 and a respective longitudinal central axis 21 of the respective stiffening element receptacle 17 run in parallel to each other. Furthermore, the five stiffening element receptacles 17 are distributed along the outer peripheral surface 18 at least substantially evenly across the outer peripheral surface 18.

In the present example, the guide cover element 19 and the stiffening element receptacles 17 are formed in one piece with each other, such that the stiffening element receptacles 17 and the guide cover element 19 are arranged or held together immovably relative to each other. Particularly preferably, the stiffening element receptacles 17 and the guide cover element 19 are made of a common textile structure. In other words, the guide cover element 19 and the stiffening element receptacles 17 are formed together in one piece.

An inner peripheral surface of the guide cover element 19 forms a receiving space, such that the cable package 13 can extend through it along the longitudinal central axis 20. In other words, the guide cover element 19 encloses the cable package 13, such that individual cables of the cable package 13 are held together in a particularly space-efficient manner. The guide cover element 19 clings particularly efficiently to the cable package 13, since the guide cover element 19 is made of the textile structure, whereby the guide cover element 19 is formed to be particularly flexibly slack.

Although only one stiffening element 16 is depicted in FIG. 3, it is to be understood that, in the present example, five stiffening elements 16 are to be used. It is equally conceivable that a number of the stiffening elements 16 used is defined by one of five different natural integer numbers. By way of example, one stiffening element 16 or three, four, six, seven, eight etc. stiffening elements 16 can be used in the feeding device 1 or the stiffening device 14.

The respective stiffening element 16 can be or is inserted into a respective receiving space delimited by an inner peripheral surface of the respective stiffening element receptacles 17. Ideally, the inner peripheral surface of the respective stiffening element receptacle 17 and a respective outer peripheral surface of the stiffening element 16 are directly adjacent to each other. As a result, the respective stiffening element 16 is held stationary in a respective stiffening element receptacle 17, such that a longitudinal central axis 22 of the stiffening element 16 coincides with the longitudinal central axis 21 of the corresponding stiffening element receptacle 17. Accordingly, the longitudinal central axis 22 of the stiffening element 16 is arranged in parallel to the longitudinal central axis 20 of the guide cover element 19 as soon as the corresponding stiffening element 16 is arranged in the respective associated stiffening element receptacle 17. In the present case, the stiffening element 16 is designed as a hose element 23, which is made wholly or partly of a synthetic polymer, i.e., silicone.

FIG. 4 shows, in a schematic view, the stiffening element 16 and the hose element 23. A hose wall 24 of the hose element 23 forms a duct element 25 which can be flowed through and/or filled with a fluid. FIG. 4 shows the hose element 23 or the stiffening element 16 in a deactivation state of the stiffening device 14, in which the stiffening element 16 or the hose element 23 is arranged in a first form characterizing the deactivation state of the stiffening device 14. By way of example, the stiffening element 16 can be flexibly slack or particularly bendable, such that the stiffening element 16 arranged in the respective stiffening element receptacle 17 follows a shape or a course of the cable package 13, since the stiffening element 16 is firmly connected to the cable package 13 via the stiffening element receptacle 17 and the guide cover element 19 which is firmly connected thereto or formed integrally therewith. For illustration purposes, such a form is depicted particularly clearly in FIG. 4. It can be seen particularly clearly that a longitudinal central fibre 26 ("neutral fibre") of the stiffening element 16 or of the hose element 23 and an imaginary longitudinal central straight line 27 are particularly far apart or deviate particularly strongly from each other.

Conversely, FIG. 5 shows, in a schematic view, the stiffening element 16 in an activation state of the stiffening device 14, in which the stiffening element 16 is acted upon by a stiffening energy, whereby the guide cover element 19, which is flexibly slack or bendable in the deactivation state, is stiffened. Accordingly, the longitudinal central fibre 26 of the stiffening element 16 or of the hose element 23 in the activation state has assumed a course and/or a shape in order to correspond in position and direction at least substantially to the imaginary longitudinal central line 27. Ideally, in the activation state of the stiffening device 14, the longitudinal central fibre 26 and the longitudinal central straight line 27 coincide. In other words, the application of the stiffening energy to the stiffening element 16 results in the stiffening element 16 being moved into a stretched position.

It is particularly preferable if the stiffening energy acts on the stiffening element 16 via compressed air arranged in the duct element 25, such that the stiffening element 16 is or becomes displaced due to the compressed air into a position characterizing the activation state of the stiffening device 14, for example the position shown in FIG. 5. The compressed air can be subjected to a pressure of 0 to 6 bar, for example. This is particularly advantageous, as this pressure range is usually available very easily anyway in modern production and/or manufacturing plants.

Figure 6:
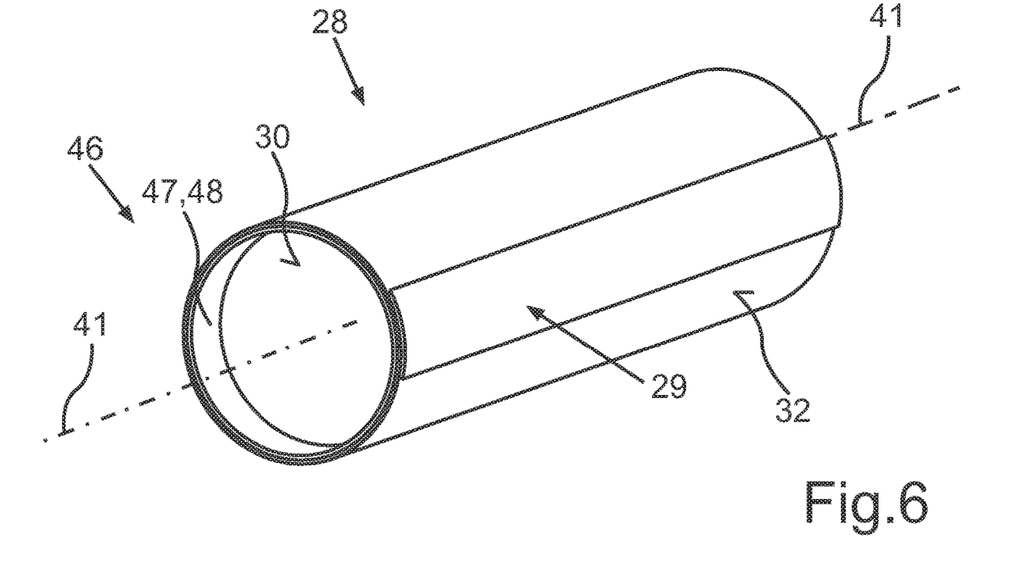
FIG. 6 is a schematic and perspective view of a protective cover element.

FIG. 6 shows, in a schematic and perspective view, a protective cover element 28, which can be opened and/or closed reversibly and non-destructively as well as without tools or tool-free along a longitudinal extension in the direction of the protective cover element 28 by means of a closing unit 29. By way of example, the closing unit 29 can have at least one Velcro fastener. In the present example, the closing unit 29 is designed as a Velcro fastener.

An inner peripheral surface 30 of the protective cover element 28 delimits a protective space 31, in which, in the present example, the cable package 13, the holding device 15, the guide cover element 19 and the stiffening elements 16 are arranged together. In other words, when the protective cover element 28 is in a protective position, i.e., when the protective cover element 28 is moved into the protective position by means of the closed closing unit 29, the protective cover element encloses the cable package 13, the holding device 15, the guide cover element 19 and the stiffening elements 16. Accordingly, an outer peripheral surface 32 of the protective cover element 28 forms at least for the most part an outer peripheral surface of the stiffening device 14 or of the feeding device 1.

In a combined view of FIG. 1, FIG. 2 and FIG. 6, it can be seen that the outer peripheral surface 32 of the protective cover element 28 is in direct contact with individual guide elements 33 of a guide device 34. A respective guide element 33 encloses the protective cover element 28 in a respective guide region, such that via the guide elements 33 or via the guide device 34, the cable package 13, the holding device 15, the guide cover element 19, the stiffening elements 16 and the protective cover element 28 are at least substantially blocked against movement along a radius of the corresponding guide element 33. In other words, the guide elements 33 or the guide device 34 only enable(s) these components to move along the longitudinal central axis 20 of the guide cover element 19.

The feeding device 1 has a length compensation region 35, which allows the cable package 13, arranged particularly closely to the manipulator arm 2, to follow a movement of the manipulator arm 2. When a portion of the cable package 13 is pulled out of the length compensation region 35, the length of the cable package 13 and the elements of the feeding device 1 which are firmly connected to it, arranged in the length compensation region 35, is extended. For this purpose, the feeding device 1 is connected at an end 36 near the end effector to the manipulator arm 2 or to the end effector 12 via a connection unit 37.

When a section of the cable package 13 is pushed into the length compensation region 35, the length of the cable package or the elements of the feeding device 1 which are fixedly connected thereto in a positionally fixed manner and which are retained in the length compensation region 35 is extended. For this purpose, the stiffening device 14 is shifted into the activation state, whereby the stiffening element 16 is acted upon by the stiffening energy, in particular compressed air, such that the stiffening element 16 at least substantially assumes or attempts to assume the form illustrated in FIG. 5 and is retained in this form. Since the stiffening element 16 is connected in a stationary manner to the cable package 13 via the stiffening element receptacle 17 and via the guide cover element 19, the stiffening energy gives the cable package 13 stiffness, such that when the end 36 of the feeding device 1 near the end effector is pushed, the cable package and the elements of the feeding device 1 that are connected in a stationary manner to it are pushed through the guide device 34 or through the guide elements 33. During this process, the outer peripheral surface 32 of the protective cover element 28 slides on an inner peripheral surface of the corresponding guide elements 33.

In order to keep the length compensation region 35 particularly compact on the manipulator arm 2, the feeding device 1 has a further connection unit 39 at an end 38 remote from the end effector, which can be designed structurally identically to the connection unit 37 with regard to a particularly advantageous common parts strategy. Accordingly, a detailed description of the connecting units 37, 39 is given below using the connecting unit 39.

Figure 7:
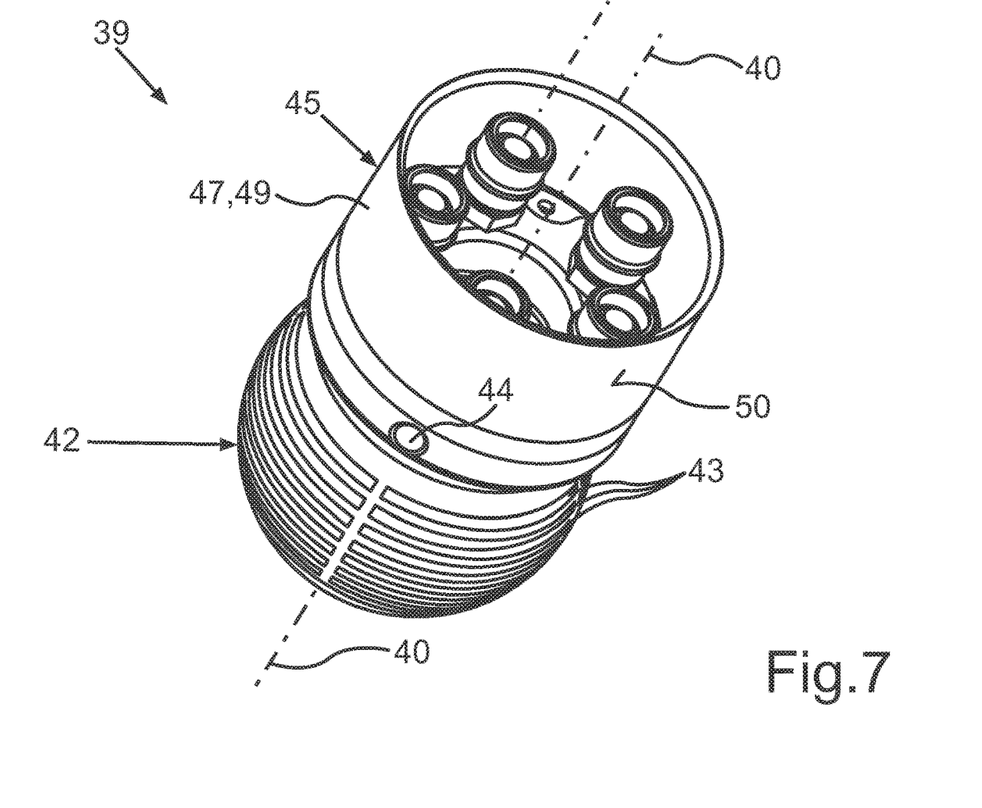
FIG. 7 is a schematic and perspective view of a composite connecting unit.

The connecting unit 39, which can be designed to be at least largely structurally identical to the connecting unit 37, is shown in a composite state in a schematic and perspective view in FIG. 7. A longitudinal central axis 40 of the connecting unit 39 coincides with a longitudinal central axis 41 (see FIG. 6) of the protective cover element 29 in an assembled state of the feeding device 1. Here, it is to be understood that the longitudinal central axes 40, 41 (see FIG. 6 or FIG. 7) coincide in an extended state of the feeding device 1, while the longitudinal central axis 40, 41 can fall apart at least in regions in a real operation of the feeding device 1 on the manipulator arm 2 or on the industrial robot 3. The same applies to a coincidence of longitudinal central axis 20 (see FIG. 3) of the guide cover element 19 with the longitudinal central axis 40 as well as to a parallelism of the longitudinal central axis 22 (see FIG. 3) of the respective stiffening elements 16 or the longitudinal central axis 21 of the respective stiffening element receptacles 17 to the longitudinal central axis 40 of the connecting unit 39. The connecting unit 39 has a joint element 42, which in the present example is designed as a ball element of a ball joint. In order to manufacture the connecting unit 39 in a particularly mass and/or raw material-efficient manner, a plurality of material recesses 43 are provided in the ball element. Furthermore, FIG. 7 shows a connecting element 44, via which the at least one stiffening element 16 or the at least one hose element 23 can be supplied with the stiffening energy or compressed air. In particular, the connecting element 44 is a threaded hole, such that a supply line of a supply device generating the stiffening energy can be screwed into it by means of a threaded connection.

The connecting unit 39 has a fastening element 45, on which, in the assembled state of the feeding device 1, respective end 46 (see FIG. 6) of the protective cover element 28 is arranged and firmly held. For this purpose, a reversible and non-destructive as well as detachable, in a tool-free manner, fastening device 47 can be provided, which in the present example is designed as a further Velcro fastener. A first Velcro fastening element 48, for example a loop strap, is arranged at the end 46 of the protective cover element 28, for example sewn to the textile fabric of the protective cover element 28. A second Velcro fastening element 49 corresponding to the first Velcro fastening element 48, for example a hook strap, can be arranged on an outer peripheral surface 50 of the fastening element 45, for example the second Velcro fastening element 49 can be adhered to the outer peripheral surface 50. However, it is also conceivable that the outer peripheral surface 50 of the fastening element 45 forms the second Velcro element 49.

Figure 8:
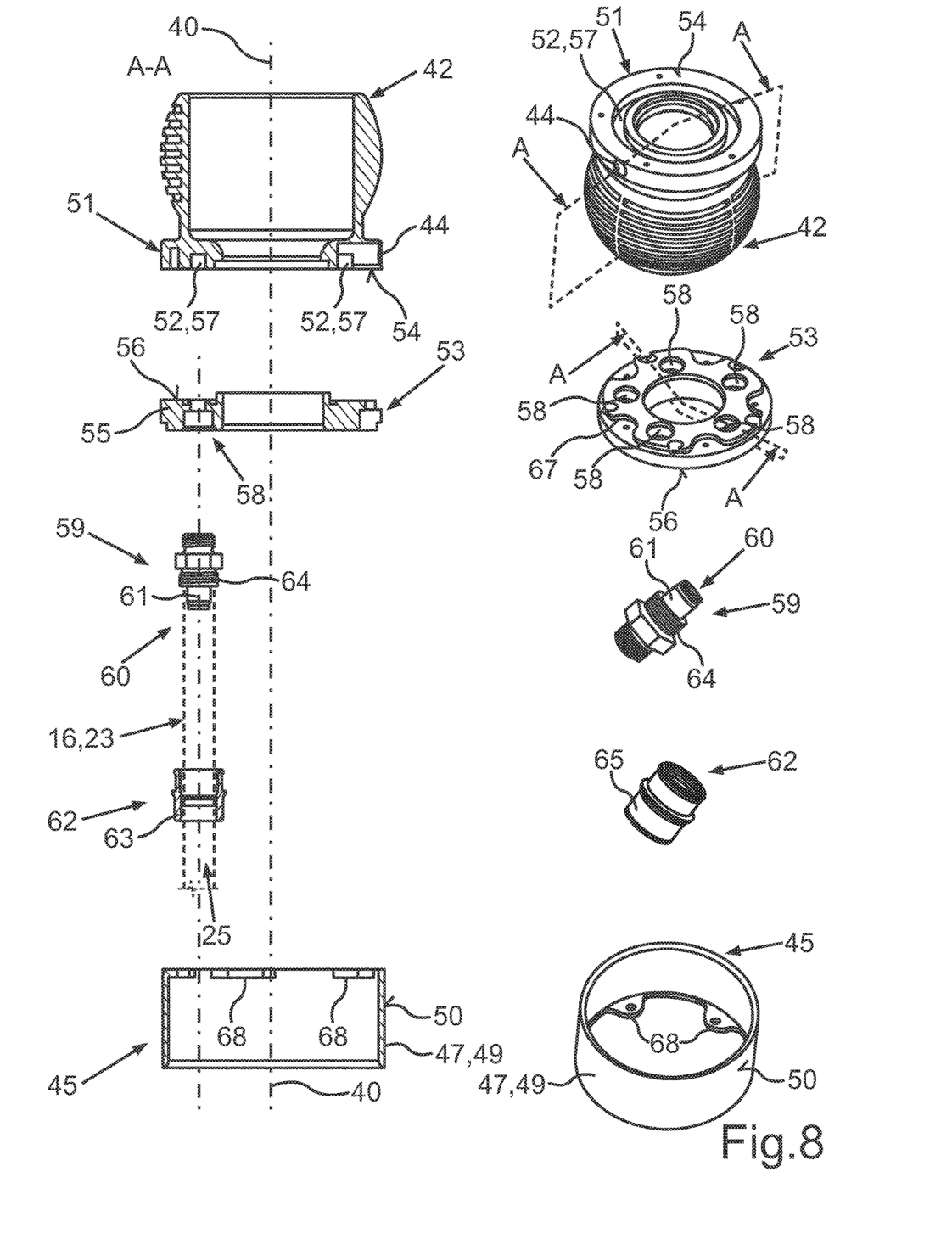
FIG. 8 shows individual elements of the connecting unit, which are partially depicted in a perspective view and in a sectional view.

FIG. 8 shows individual elements of the connecting unit 39, which are partially depicted in a perspective view and a sectional view. The joint element 42, which is designed as a ball element and is connected to a base portion 51, can be seen. In particular, the base portion 51 and the joint element 42 can be formed in one piece. Furthermore, the connecting element 44 can be recognized, which can be flowed through by a fluid, in particular the compressed air, and which flows into a distributor element 52 of a distributor module 53. The distributor element 52 is formed in the present example as an annular groove, which is moulded into a surface 54 of the base portion 51.

The distributor module 53 has a sealing plate 55, the sealing surface 56 of which is in direct contact with the surface 54 of the base portion 51 or the joint element 42 in the assembled state of the connecting unit 39, such that the distributor element or the annular groove 52 together with the sealing surface 56 delimit a distributor duct element 57. For a particularly good fluidic seal between the base portion 51 and the sealing plate 55, at least one sealing element, which is in particular toroidal, can be provided between the base portion 51 and the sealing plate 55.

The sealing plate 55 and the base portion 51 can be screwed together. Alternatively or additionally, the sealing plate 55 and the base portion 51 or the joint element 42 can be formed in one piece, for example by means of a generative manufacturing process. Furthermore, the sealing plate 55 and the base portion 51 can be connected to each other in a force-, form- and/or material-locking manner. It is particularly preferable if a thermal joining process, for example welding, is used to join the sealing plate 55 and the base portion 51 to each other.

Furthermore, the sealing plate 55 has at least one receiving element 58, which has an internal thread and completely penetrates the sealing plate 55. By means of a threaded connection, a coupling element 59 can be arranged in the receiving element 58, in particular can be screwed in, whereby the coupling element 59 is firmly held in or on the sealing plate 55. In the present example, the sealing plate 55 has five receiving elements 58 and five coupling elements 59. A fluid, in particular the compressed air, can flow through a respective coupling element 59, such that one end 60 of the respective coupling element 59 on the stiffening element side is fluidically connected to the distributor duct element 57 via the respective receiving element 58. In other words, the connecting element 44 is fluidically connected to the end 60 on the stiffening element side of the respective coupling element 59.

Via a respective end 60 on the stiffening element side of the respective coupling element 59, the respective stiffening element 16 or the respective hose element 23 is fluidically connected to the connecting element 44, since the respective coupling element 59 is at least indirectly fluidically connected to the one connecting element 44. By way of example, the hose element 23 can be plugged fluidically tightly onto a coupling section 61 of the coupling element 59, such that the coupling section 61 extends into the duct element 25.

In order to achieve a particularly tight fit and/or a particularly high sealing effect between the coupling section 61 and the stiffening element 16 or the hose element 23, a holding element 62 is provided, which has an internal thread that can be screwed to a holding thread 64 of the coupling element 59 between a holding region 63 of the holding element 62 and the coupling section 61 when the hose wall 24 of the hose element 23 is tensioned or clamped. By way of example, the holding region 63 can be conically tapered inside the holding element 62, such that a clamping effect for the hose element 23 becomes stronger the further the holding element 62 is screwed onto the holding thread 64. Furthermore, the holding element 62 has a double function, as it has a further holding region 65, which is designed to hold one end 66 (see FIG. 3), on the connection unit side, of one of the stiffening element receptacles 17, which is held on or in the further holding region 65 by means of a clip or retaining clip which is not described in more detail. In the present example, the holding element 62 can resemble a union nut in form and function.

The fastening element 45 can be screwed to the sealing plate 55, wherein the sealing plate 55 has a rotation lock link 67, into which the fastening element 45 engages via link elements 68 corresponding to the rotation lock link 67. In this way, it is particularly effectively ensured that a torsional force acting on the fastening element 45 from outside via the protective cover element 28 and via the fastening device 47 does not cause the fastening element 45 and the sealing plate 55 to be rotated relative to each other.

In contrast to the connecting unit 39 remote from the end effector, the connection unit 37 close to the end effector seals the five stiffening elements 16 fluidically connected to it, such that the stiffening enemy, in particular the compressed air, cannot escape from the stiffening device 14 or from the feeding device 1 at the end 36 close to the end effector. If the connecting units 37, 39 are designed as a common part, i.e., identical in construction, the connecting unit 37 near the end effector would comprise the connecting element 44, via which the compressed air could escape into an environment of the feeding device 1. Accordingly, a closing element not depicted is provided, by means of which the connecting element 44 near the end effector or the threaded hole near the end effector can be fluid-tightly locked or sealed. Alternatively, it can be provided that the threaded hole is moulded into a respective base portion 51 only as required, in particular if it is clear whether the common part is used as a connecting unit 39 remote from the end effector or as a connecting unit 37 close to the end effector. Due to the omission of the connecting element 44 or due to the fluid-tight sealing of the connecting element 44 of the connecting unit 37 near the end effector, the stiffening elements 16 held on the connecting unit 37 via the coupling elements 59 form a common, fluid-tight end.

With renewed reference to FIG. 1 and FIG. 2, a sensor element 69 is depicted, which is part of a sensor device 70. By means of the sensor device 70, a state of the stiffening device 14 and/or the feeding device 1 can be detected. This can be, for example, a temperature, pressure, degree of wear etc. of the feeding device 1 or the stiffening device 14. Of particular interest is the detection of the degree of wear and/or the detection of a defect or imminent defect of the protective cover element 28 and the stiffening elements 16. By means of the sensor device 70, a sensor signal can be provided which characterizes the state of the stiffening device 14 or the feeding device 1 detected via the sensor element 69. This sensor signal characterizing the state is an evaluation unit not described in detail, for example a display unit, such that data and/or parameters of the feeding device 1 or the stiffening device 14 can be provided to a user or operator of the manipulator arm 2 or industrial robot 3.

Figure 9:
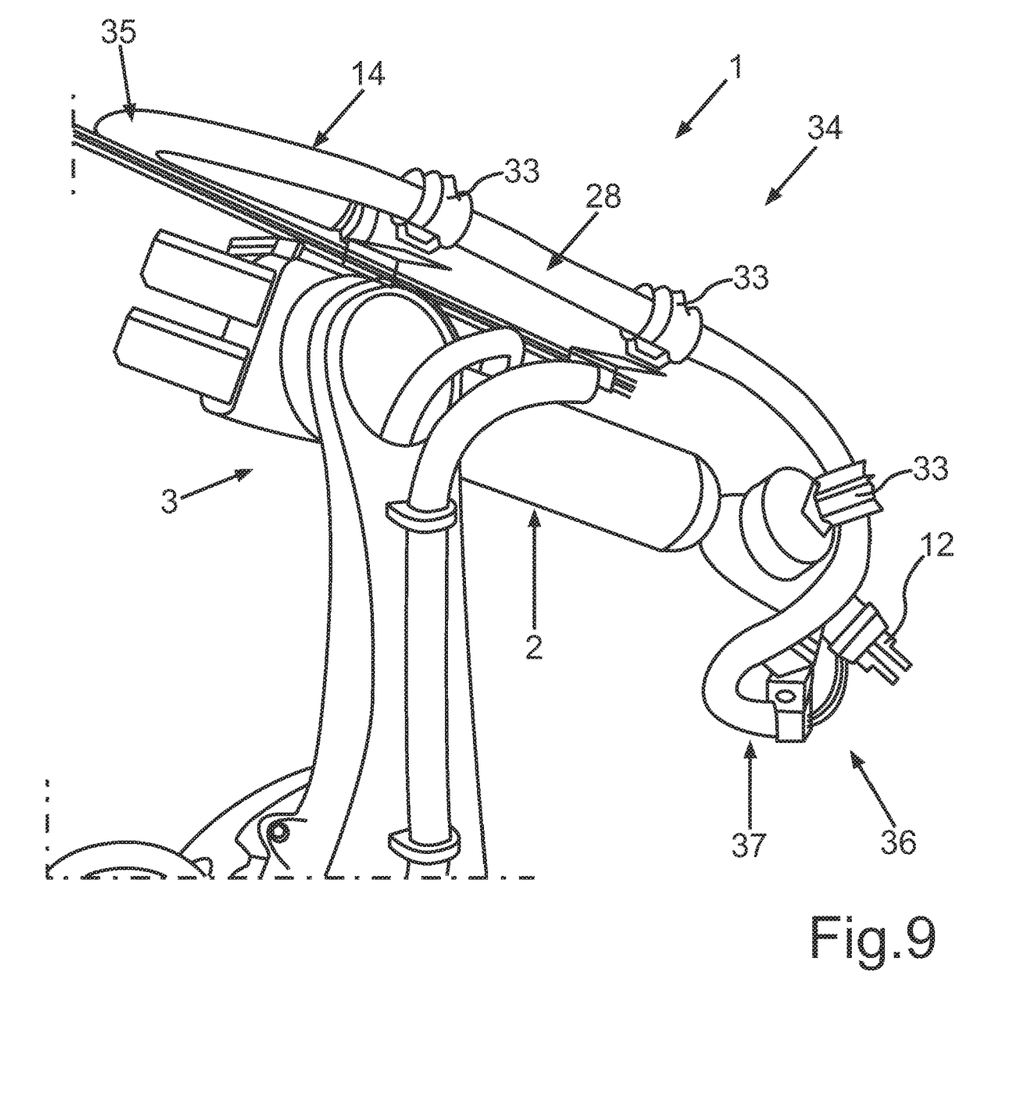
FIG. 9 is a perspective view of an industrial robot equipped with the feeding device.

FIG. 9 shows, in a perspective view, the industrial robot 3 equipped with the feeding device 1 or the manipulator arm 2 equipped with the feeding device 1. Here, it is particularly easy to see how the protective cover element 28 is held particularly close, i.e., substantially parallel, to the manipulator arm 2 by means of the guide device 34 or by means of the guide element 33. As a result, the elements of the feeding device 1 enclosed by the protective cover element 28 can be held equally close or parallel to the manipulator arm 2 and can be guided by means of the guide device 34.

The stiffening device 14 is designed in such a way that it can be applied to already existing robot systems or manipulator arms and/or industrial robots, in particular can be retrofitted.

The invention claimed is:

1. A feeding device for a manipulator arm, comprising:
a joint of an industrial robot having a flexible cable package via which a process medium is feedable at least substantially along an end effector of the manipulator arm and having a flexibly slack guide cover element, wherein the flexibly slack guide cover element encloses the flexible cable package; and
a stiffening device, wherein the stiffening device has:
a holding device which has five stiffening element receptacles which are arranged along an outer peripheral surface of the flexibly slack guide cover element and are distributed along the outer peripheral surface of the flexibly slack guide cover element evenly across the outer peripheral surface of the flexibly slack guide cover element, wherein the holding device and the flexibly slack guide cover element are each made of a textile structure;
five stiffening elements, wherein the five stiffening elements are inserted into a respective one of the five stiffening element receptacles, wherein, in an activated state of the stiffening device, the stiffening elements are acted upon by stiffening energy, whereby the flexibly slack guide cover element and the flexible cable package are stiffened by the stiffening elements, and wherein the stiffening elements are each a flexibly slack hose element, a hose wall of which delimits a duct element through which a fluid is flowable and which is completely filled with the fluid in the activated state; and
a flexibly slack protective cover element made of the textile structure, wherein the flexibly slack protective cover element is formed separately from the flexibly slack guide cover element, wherein the flexibly slack protective cover has a closing unit which is reversibly and non-destructively adjustable between an open position, in which the flexibly slack protective cover element is open along a longitudinal direction of extension of the flexibly slack protective cover element, and a protective position, in which the flexibly slack protective cover element is closed along the longitudinal direction of extension and encloses the flexible cable package, the holding device, the flexibly slack guide cover element, and the stiffening elements, and wherein the closing unit has at least one Velcro fastener which is sewn to the textile structure of the flexibly slack protective cover element.

2. The feeding device according to claim 1, wherein the holding device and the flexibly slack guide cover element are formed together in one piece.

3. The feeding device according to claim 1, wherein a first end of the stiffening device is formed by a first connecting unit via which the stiffening device is attachable to the manipulator arm remote from the end effector.

4. The feeding device according to claim 3, wherein a second end of the stiffening device is formed by a second connecting unit via which the stiffening device is attachable to the manipulator arm near the end effector.

5. The feeding device according to claim 1, wherein the stiffening device has a sensor device having a sensor element via which a sensor signal characterizing a state of the stiffening device is made available to an evaluation unit.

* * * * *